United States Patent [19]
Todd

[11] 3,876,882
[45] Apr. 8, 1975

[54] METHODS AND APPARATUS FOR DETERMINING THE SPATIAL DISTRIBUTION OF A RADIOACTIVE MATERIAL

[75] Inventor: Robert William Todd, Southampton, England

[73] Assignee: National Research Development Corporation, London, England

[22] Filed: Mar. 26, 1973

[21] Appl. No.: 344,529

[30] Foreign Application Priority Data
Mar. 28, 1972   United Kingdom............... 14591/72

[52] U.S. Cl. ................. 250/370; 250/366; 250/369; 250/371
[51] Int. Cl. .............................................. G01t 1/24
[58] Field of Search ............ 250/370, 371, 366, 369

[56] References Cited
UNITED STATES PATENTS
3,140,395   7/1964   Scherbatskoy...................... 250/366
3,558,887   1/1971   Hick et al. .......................... 250/370

*Primary Examiner*—Archie R. Borchelt
*Attorney, Agent, or Firm*—Donald D. Jeffery

[57]   ABSTRACT

The spatial distribution of a radioactive material is determined by locating the positions of and energy losses resulting from Compton interactions which occur in a detector as a result of gamma photons emitted by the radioactive material, which may, for example, have been administered to a patient for medical diagnostic investigation.

14 Claims, 12 Drawing Figures

METHODS AND APPARATUS FOR DETERMINING THE SPATIAL DISTRIBUTION OF A RADIOACTIVE MATERIAL

BACKGROUND OF THE INVENTION

In recent years it has become common practice to obtain diagnostic information by ascertaining the distribution of a radioactive pharmaceutical within the human body. The appropriate radioactive material with suitable gamma ray emission is selected which, on administration to the patient, either orally or by intravenous injection, accumulates in the organ selected, say, the lungs, liver, spleen, pancreas, placenta, thyroid or brain. The materials used include iodine 125, iodine 131, indium 113m and technetium 99m. It is then the distribution of the gamma emission of the organ which is of diagnostic value.

This distribution has until now always been ascertained by methods of scanning and camera imaging, based on the photoelectric interaction of gamma photons with matter. Cameras in common use are the Anger camera and more recently forms of semiconductor camera. All such cameras require a lead collimator, and the spatial resolution and sensitivity of such cameras is severely limited by the presence of the collimator.

SUMMARY OF THE INVENTION

One object of the present invention is to provide methods and apparatus for determining the spatial distribution of a radioactive material without the need for a collimator.

Another object of the present invention is to provide methods and apparatus for determining the spatial distribution of a radioactive material which result in improved resolution.

Another object of the present invention is to provide methods and apparatus for determining the spatial distribution of a radioactive material which uses information derived as a result of Compton interactions in a detector.

According to the present invention there is provided a method of determining the spatial distribution of a radioactive material, comprising positioning a detector adjacent to the location of the radioactive material, determining the positions of and energy losses associated with Compton interactions which occur in said detector as a result of gamma photons emitted by the radioactive material, and deriving in dependence on said positions and energy losses information as to the spatial distribution of the radioactive material.

According to the present invention there is also provided apparatus for determining the spatial distribution of a radioactive material, comprising a detector which in use of the apparatus is positioned adjacent to the location of the radioactive material, means for determining the positions of and energy losses associated with Compton interactions which occur in said detector as a result of gamma photons emitted by the radioactive material, and means for deriving in dependence on said positions and energy losses information as to the spatial distribution of the radioactive material.

Such methods and apparatus may be used for medical diagnostic investigations.

Thus considering for example a single point source of radioactive material, this may give rise to a gamma photon which results in a first collision within the detector. The position and energy lost in the collision are recorded. Because it is Compton interactions and not photoelectric interactions which are being investigated, this collision results in a reduced energy gamma photon which may be involved in a second collision at a second point within the detector. The position of this second collision is also recorded. If then a cone with a semi-angle equal to the Compton scattering angle is projected back along the line joining the positions of the first and second collisions, the ellipse formed where the cone intersects the object plane represents a probability function that the point source lies on its circumference. Further gamma photons liberated from the point source will accumulate further probability ellipses in the object plane, and the point of maximum intersection of these ellipses indicates the position of the point source. A suitable density analysis therefore indicates the position of the point source.

This whole procedure can be performed electronically at high speed, producing a picture on a storage tube in which, by blanking techniques, only the dense source point is visible. A complete picture of the object is constructed from many source points.

The present invention avoids the limitations of the known apparatus because no collimator is required. Moreover, as will be clear from the subsequent description, the invention permits of improved energy resolution which allows a spatial resolution of a few millimeters. For similar reasons the efficiency of the detector is much higher than in the known arrangements, thus facilitating high counting rates, which enables several pictures to be formed per second, if required.

In addition, the use of the invention enables the energy range of usable radioisotopes to be considerably extended, and energies within the range 0.12 – 2.5 MeV may be used. This, together with the high order of energy resolution possible with semiconductor detectors, enables the effects of radiation scatter in body tissue to be almost completely eliminated.

A further advantage of the invention is that with a suitable geometric configuration it is possible by electronic parameter adjustments to examine planes of activity within the region under consideration. This makes three-dimensional analysis, sometimes referred to as tomographic scintitraphy, possible.

INTRODUCTION TO THE DRAWINGS

The invention will now be further described by way of example with reference to the accompanying drawings, in which:

FIG. 1 shows diagrammatically the general principle of operation of apparatus in accordance with the invention, FIG. 2 is a diagram indicating how a point source is located, FIG. 3 shows diagrammatically the form and operation of a detector, FIG. 4 shows diagrammatically three collisions of a gamma photon within a detector, FIG. 5 is a block diagram of apparatus according to the invention, FIG. 6 shows diagrammatically a detector head of the apparatus of FIG. 5, FIGS. 7 and 8 show side and underneath diagrammatic views of a detector of the apparatus of FIG. 5, FIG. 9 shows a diagrammatic side view of part of the detector of FIGS. 7 and 8, FIGS. 10 and 11 show diagrammatically the derivation of pulses from the detector of FIGS. 7 and 8, and FIG. 12 is a block diagram of a calculating device of the apparatus of FIG. 5.

DESCRIPTION OF THE PREFERRED EMBODIMENT

Figure 1:
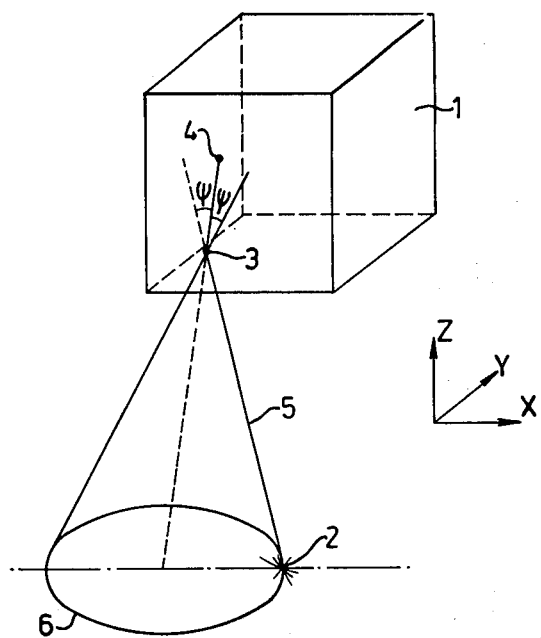
Figure 2:
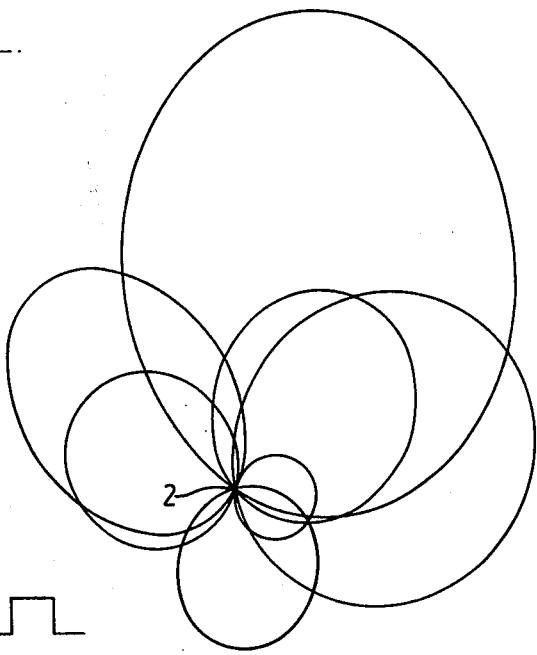

The basis of the invention will be understood by reference to FIG. 1 and the following description. This figure shows in purely diagrammatic form a detector 1 and a radioactive point source 2. When a gamma photon is emitted from the source 2 in an appropriate direction a collision takes place at a point 3 within the detector 1. The position of the point 3 and the energy lost in the collision are recorded. The reduced energy gamma photon produced in the collision then proceeds to collide again at point 4. The position of point 4 is also recorded. If a cone 5 of semi-angle $\psi$ equal to the Compton scattering angle is projected back to the object plane from the point 3 with the line joining the points 4 and 3 as the axis of the cone, the ellipse 6 so formed in the object plane represents a probability function that the source 2 lies at some point on its circumference. Further gamma photons liberated from the source 2 will accumulate further probability ellipses in the object plane to give a representation as shown in FIG. 2. A density analysis of this picture gives a clear representation of the position of the source 2. This whole procedure is performed electronically at high speed, producing a picture on a storage tube, where, by blanking techniques, only the dense source point is visible. An object picture is then constructed of many such source points.

Figure 3:
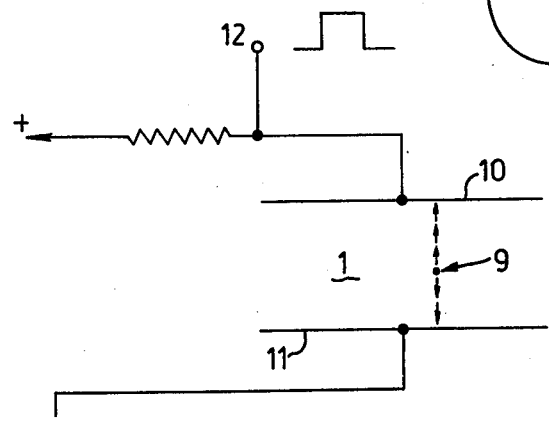

The preferred form of the detector 1 is a semiconductor radiation detector, which may be considered as a solid ionisation chamber. Referring to FIG. 3, in which the detector 1 is again shown purely diagrammatically, when an incident gamma photon collides with an electron of an atom at a point 9 in the detector 1, both the electron and the gamma photon are scattered. The scattered electron is commonly referred to as a recoil electron. The recoil electron produces electron-hole pairs which are then swept to an anode 10 or cathode 11, as indicated by the arrows, under the influence of an applied electric field. This results in an output energy pulse at a terminal 12. By using a semiconductor detector a high counting rate is possible, combined with exceptional energy resolution. The stopping power of silicon and germanium is sufficient to enable high sensitivity to be obtained with a material depth of a few centimeters. With silicon the Compton effect is predominant in the energy range 0.12 - 2.5 MeV.

In considering the energy resolution and the actual form of the detector, it is necessary to bear in mind that with either silicon or germanium it is necessary to reduce leakage currents between the anode 10 and the cathode 11 if an unacceptably high noise level is to be avoided. This may be done either by compensating the material, thereby reducing the effective impurity concentration as in lithium drifted detectors, or by forming a diode configuration and hence a depletion region from which the free carriers can be swept away by the influence of the applied field. This latter approach is preferred.

The amount of energy required to produce one electron-hole pair in silicon is 3.5eV, which is an order lower than for a proportional gas chamber, thus for 100 KeV energy loss, 28.5 × 10³ electron-hole pairs are liberated. The statistical fluctuation in this process may be considered in terms of the full width half maximum energy resolution capability $\Delta_E$, which is given by:

$$\Delta_E = 2.36 \, \omega \, (E/\omega)^{1/2} F^{1/2} \text{eV}$$

for silicon $\omega = 3.5$ $E$ = energy lost in the collision
$F$ = the Fano factor.

For the case in which the incident particle comes to rest in the sensitive region of the detector, the ionisation events should not be treated as completely independent, since the primary particle must lose the exact amount of its initial energy. This causes the distribution to be non-Gaussian and therefore the value of the mean square fluctuation in the number of ion pairs produced to be reduced by a factor 'F' the Fano factor. This has been measured in silicon to be as low as 0.1.

The second effect to be considered is the leakage current; this is predominantly due to the generation of carriers in the depletion region (other than diffusion current). Thus:

$$\Delta_G = 2.36 \, \omega \, \left| \frac{2 A K_r}{\pi} \quad \frac{25 \, 10^{-15}}{1.6 \, 10^{-19}} \, (\rho V)^{1/2} \right|^{1/2} \text{eV}$$

where $\Delta_G$ = the full wave half maximum energy resolution component due to the carrier generation in the depletion region.

$\rho$ = resistivity of the material
$V$ = applied bias
$A$ = area in cm²
$\pi$ = carrier lifetime
$K_r$ = amplifier response time.

Cooling to minus 20°C. reduces this effect by several orders of magnitude.

In order to determine the Z direction co-ordinates with sufficient accuracy, the detector 1 is built up in the form of discrete slices about 0.5 mm. thick as described in more detail below. In order to obtain a sensitive depth of 0.5 mm. one of two approaches may be followed; either a PN junction is formed in N-type silicon, or the P-type silicon may be compensated by lithium drifting to form a PIN junction. The advantage of lithium drifting is that sensitive depths of about 1 to 2 cm. can be manufactured, which in germanium, gives a reasonable stopping power. Reference to the curves of linear attenuation coefficient against energy for both germanium and silicon show, incidentally, that for germanium and silicon (particularly the latter) the range of isotope energies for which the photoelectric effect is predominant is severely limited, whilst for the Compton interaction, a large range of energies are available.

The use of lithium drifted germanium does have the disadvantage that the detector 1 needs to be cooled by liquid nitrogen to reduce the leakage current. This cooling in turn necessitates keeping the detector system at very low pressure by continuous pumping.

However a sensitive depth of 0.5 mm. per slice is adequate and this can be obtained as the depletion region of a PN junction using high resistivity silicon. This is done by fabricating a Schottky barrier on the surface of the silicon, and then biasing the device with a sufficient electric field to produce the 0.5 mm. depth required (that is the slice thickness).

The determination of the X, Y co-ordinates of the interactions can be approached in one of two ways:

a. A resistive layer can be produced as a sheet across the surface of the detector 1 and then by applying electrodes in suitable positions, the ratio of pulse heights can be analysed to give the interaction position.

b. The second approach is to form orthogonal discrete barriers on the silicon surface and then to encode the Schottky array by using a transformer matrix assembly.

A further advantage of the approach is that the inter-electrode capacitance is considerably reduced; this results in a sharper pulse thus enabling the effects of noise to be reduced. It is further possible, if required, to analyse the pulses produced from the detector and hence determine the depth of the interaction within the slice.

An important consideration of any sandwiching system is the losses between the active layers. The Schottky barrier is admirable in that the dead space in each layer is very small (about $1\mu M$). Considering an energy loss of say 140 KeV, the path length of the recoil electron is $10^{-4}$ meters; thus the energy loss per $\mu M$ is:

$$\frac{140.10^3}{10^{-4}} \cdot 10^{-6} \text{ eV} = 1.4 \text{ KeV}$$

so that in those cases where the recoil electron traverses the slice gap, only a few KeV of energy is likely to be lost, which is tolerable.

Figure 4:
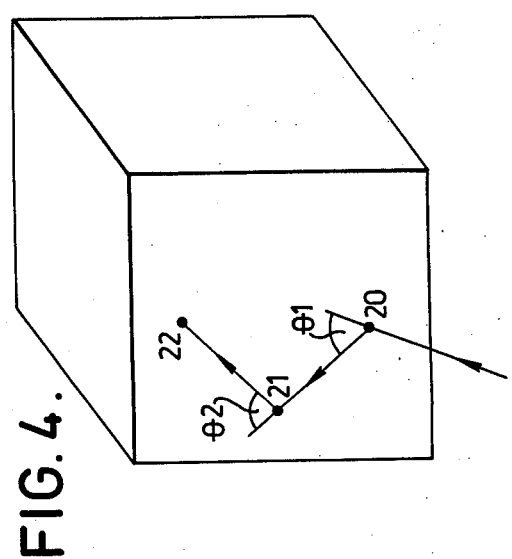

In initially describing the invention with reference to FIG. 1, a knowledge of the source energy was assumed in order to determine the relationship of collision angle with energy lost. This also presupposes a monoenergetic gamma source 2. If however the first three, instead of the first two, collisions are considered, then it is possible to select any known source energy at will. FIG. 4 illustrates such a system.

The collision points 20, 21 and 22 are determined along with the energies lost in the first and second collisions. The computation is commenced by assuming the incident photon (of possible energies A, B and C) to be of energy A. If the energy lost at point 20 is P then the photon incident at point 21 must have energy (A-P). If the energy lost at point 21 is Q then a determination of ((A-P)-Q) must give the collision angle at point 21. Collision point 22 must make this angle with respect to vector 20-21.

Consider the vector equation:

$$\overline{R}.\overline{S} = |R|.|S|.\cos\theta$$

where $\theta$ is the angle between $\overline{R}$ and $\overline{S}$. This angle is given by evaluation of Compton equation.

$$\lambda' - \lambda = \frac{h}{m_o c}(1 - \cos\theta)$$

where $\lambda$ and $\lambda'$ are the wavelengths of the photon before and after collision respectively, $h$ is Planck's Constant $m_o$ is the rest mass of an electron, and $c$ is the velocity of light.

If the vector equation is tested with $\overline{R}$ given by vector 20-21 and $\overline{S}$ by vector 21-22 for $\theta$ then:

$$\frac{\overline{R}.\overline{S}}{|R|.|S|} = \cos\theta$$

the validity of the original energy assumption is known. If $\theta$ is found to be incorrect, then energy B is assumed for the source and the process repeated until one of the energies is verified.

It has also been assumed that the collision photons are scattered forward; this is not always the case but an application of the previous procedure will be unable to verify the incident photon energy, and since back scattered photons are unusable, the information is then rejected. This procedure also excludes photons that have been subjected to body tissue scattering.

The number of collisions taking place in the detector 1 for each incident photon will obviously vary. A photon undergoing fewer than three collisions will be rejected. Three is an ideal number, but four or five (or even more) collisions can be handled by an iterative type of computation similar to the previous process.

The pulse width of a typical interaction within the detector 1 is less than 100 nS, thus theoretically permitting counting rates of 10 MHz. A value this high cannot be used in practice because some time must be allowed for the computation of position and energy lost etc., but values between 1 and 5 MHz can be realised.

As mentioned previously the object picture may be considered as being composed of many source points. Each of these points results from the intersection of derived probability ellipses. If the object plane is offset, then these ellipses will no longer be focussed and hence no image will be produced. Thus considering a three dimensional source, the camera can be focussed onto various planes at will. The thickness of each plane will be dependent on the geometric configuration of the source to camera alignment in a similar fashion to the depth of field obtained with a normal optical camera.

Figure 5:
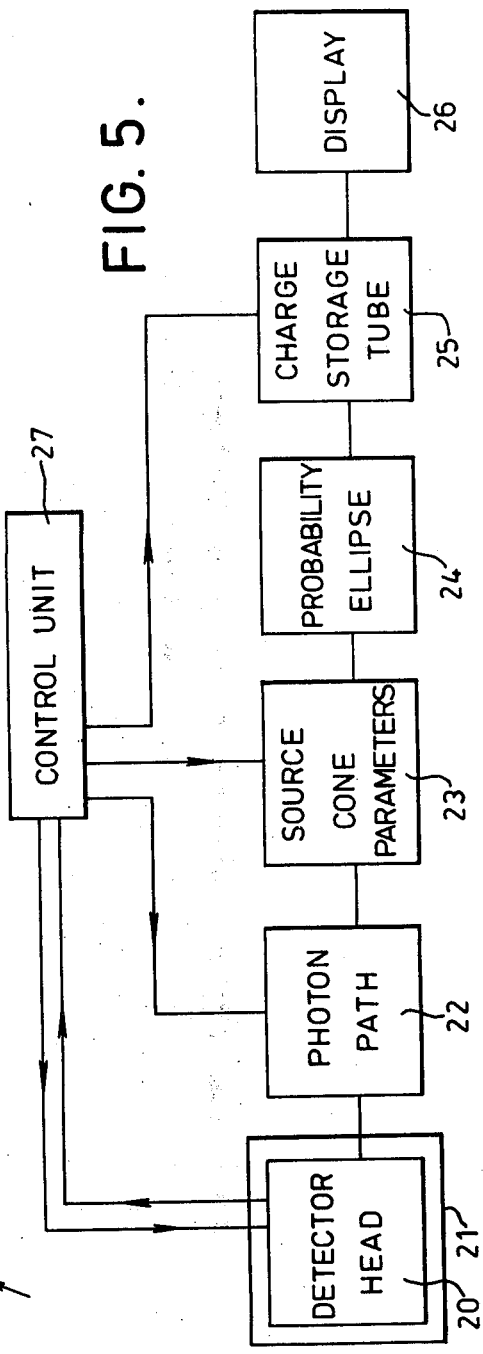

FIG. 5 shows a block diagram of the complete apparatus. Such apparatus is able to image a point source to within a few millimeters. The resolution of apparatus hitherto used is 1 centimeter or more, so that small defects in an organ can easily be missed and the internal structure of the organ or defect is not resolved. The improved spatial resolution of the present apparatus provides an answer to both these problems.

FIG. 5 indicates the source 2, adjacent to the location of which is positioned a detector head 20 within a temperature controlled enclosure 21. The output of the detector head 20 is supplied to a processing unit comprising means 22 to determine and correlate the photon path, means 23 including a digital file of ellipse parameters to determine the source cone parameters, and means 24 to generate the probability ellipse. The output of the processing unit 22 to 24 is supplied to a charge storage tube 25 and thence to means 26 to display the image. The apparatus also includes a control unit 27 which in particular controls the position and geometric configuration of the detector head 20; controls scatter rejection by the means 22 and also supplies thereto incident energy information; controls the means 23 to set the object plane to be analysed; and controls the operation of the change storage tube 25. The control unit 27 itself is under the control of an operator viewing the image display means 26.

Figure 6:
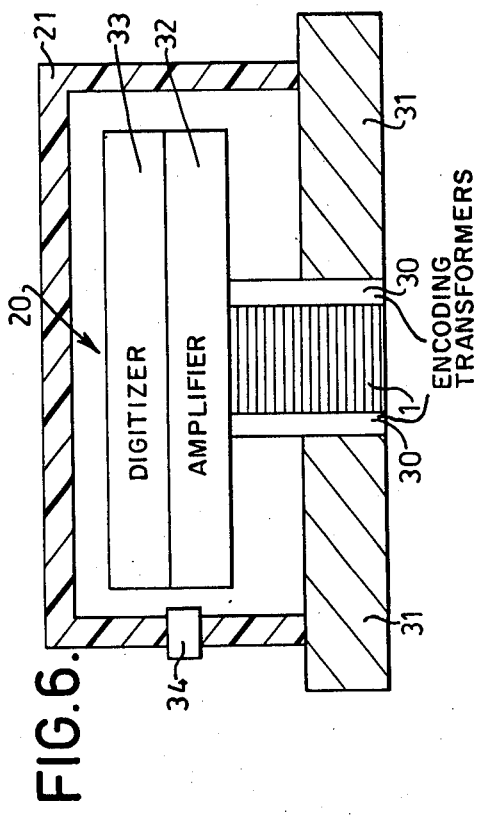

Referring now to FIG. 6, the detector head 20 comprises, in addition to the detector 1 and enclosure 21, encoder transformers 30 disposed adjacent to the sides of the detector 1 and encircling this assembly a lead shield 31 which can be adjusted in position relative to the detector 1 to control the field of view. Signals derived from the transformers 30 are amplified and digitised by an amplifier 32 and a digitiser 33 within the enclosure 21 to improve the signal to noise ratio, and the resulting signals are supplied from the detector head 20 via a connector 34.

Figure 7:
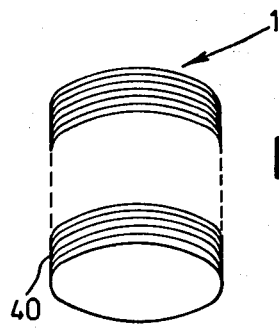
Figure 9:
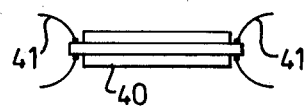
Figure 8:
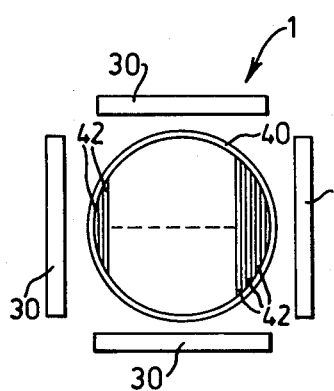

Referring now to FIGS. 7 to 9, the detector 1 comprises a hundred slices 40 of silicon on which a detector array has been made. Each slice 40 is made as follows: A 0.5 mm. thick slice is cut from a 5 cm. diameter ingot of 20,000 ohm/cm n-type silicon with the axis along the 1,1,1 crystallographic direction. The edge of the slice 40 is recessed as shown in FIG. 9, or alternatively, is tapered, to provide space for leads 41. One side of the slice 40 is lapped and the other side lapped and polished. The slice 40 is then etched in about 120 ml. of a 5/3/3 mixture of $HNO_3/HF/CH_3COOH$ for 24 minutes at 0°C. The etching reaction is then quenched with the addition of 40 ml. of HF. About 10 to 15 seconds after the addition of the HF, deionised water is gradually added and this is continued until the overflowing water has a resistance of about 1 megohm/cm.

The slice 40 is stored in deionised water, which is changed daily, for two weeks, care being taken to minimise exposure to air. Gold is then evaporated on to one side of the slice 40 using a glass grid to form fifty strips 42 not quite reaching to the recessed edge of the slice 40. Aluminium is then evaporated on to the other side of the slice 40, in a similar configuration and again using a glass grid, but with the aluminium strips 42 orthogonal to the gold strips 42. Each strip 42 is connected to a respective lead 41 by silver paste.

The slice 40 is then tested. The leakage current should not exceed 0.1 $\mu amp/cm^2$.

The detector 1 is made up of a sandwich of one hundred slices 40 arranged so that in the spaces aluminium strips 42 on one slice 40 are adjacent to aluminium strips 42 on the next slice 40 and similarly gold strips 42 are adjacent. The spaces therefore alternate with aluminium and gold strips 42 through the detector 1. The whole sandwich is jigged together with the encoder transformers 30, which are coupled as shown in FIG. 10 to which reference is now made.

Figure 10:
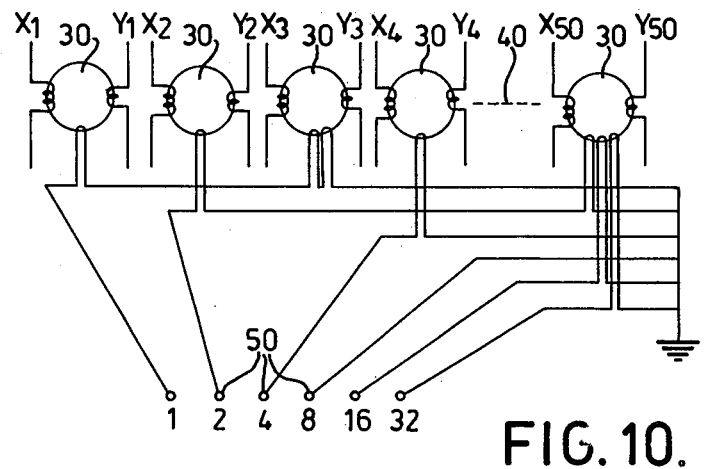

FIG. 10 shows some of the transformers 30 for one slice 40 which identifies a position $Z_i$ in the Z-plane. In all there are fifty transformers per slice 40, the X-windings being of two turns and the Y-windings of one turn, all the windings being connected to respective leads 41. Output pulses are brought out to binary-coded terminals 50. Pulses for the X-plane are plus two units of voltage, and for the Y-plane are minus one unit of voltage so that X and Y pulses can be distinguished, and also so that if a collision occurs at $X_iY_i$ the resulting pulse of plus one unit of voltage indicates this position.

This arrangement does not allow for resolution of two collisions in one slice 40, but if this occurs the resulting information is rejected by the processing unit 22 to 24 (FIG. 5.).

Figure 11:
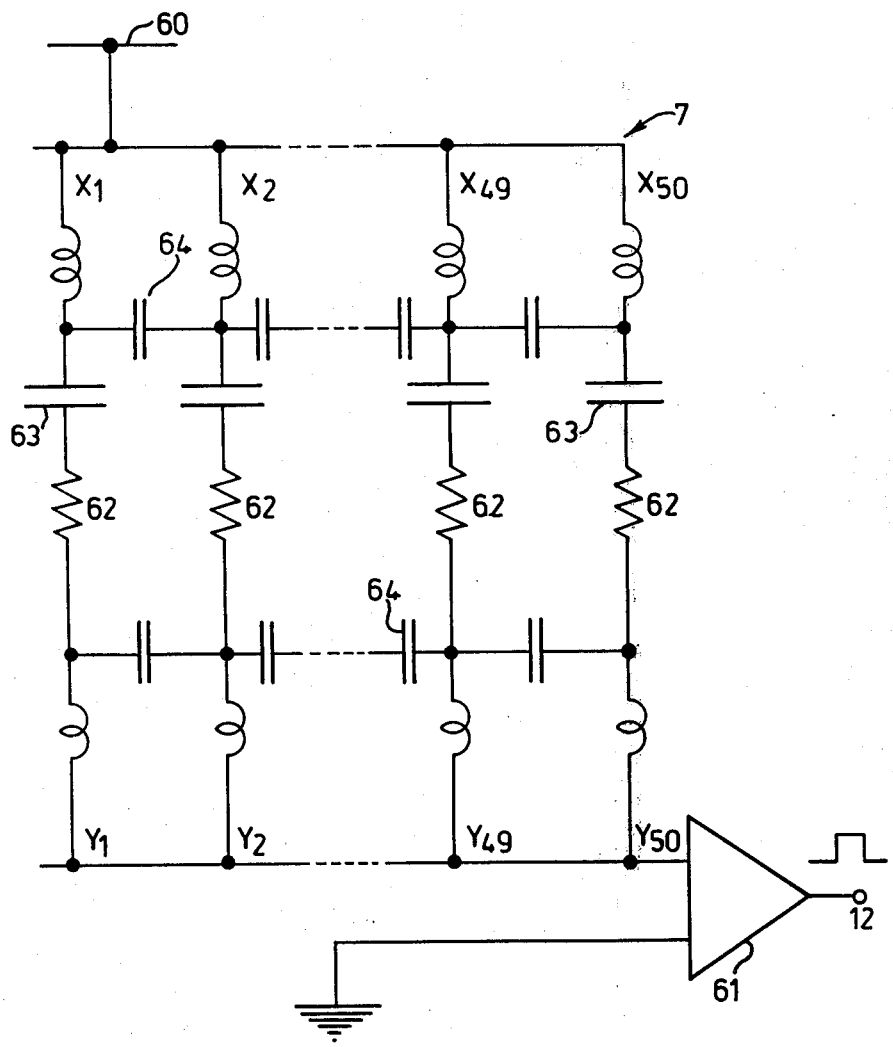

Referring to FIG. 11, this shows the connection of the X and Y windings in series in pairs between a supply line 60 and a pulse shaping amplifier 61. Each series connection incudes a resistor 62, whilst the capacitors 63 and 64 which are shown indicate the capacitance of the slice 40 (FIG. 9) and the inter-strip capacitance respectively. On the occurrence of each Compton interaction, the amplifier 61 supplies a pulse to the terminal 12 (also shown in FIG. 3) the amplitude of this pulse indicating the energy lost by the gamma photon at the interaction.

As mentioned above in connection with FIG. 6, the detector 1 can be moved relative to the lead shield 31 to alter the field of view. A sensor can be provided to determine the position. It should perhaps be emphasised that the lead shield 31 is not acting as a collimator, as the detector 1 can accept gamma photons from any direction which is in its field of view.

The detector 1 thus supplies the positional information $X_iY_iZ_i$ and the energy information $\Delta E_i$. The width of the binary-coded pulses produced by the detector 1 are about 50 ns and these pulses are fed in parallel to a set of registers which provide the input signals for the processing unit 22 to 24 (FIG. 5).

Rearranging the vector equation given above, we have:

$$\frac{\overline{RS}}{|R|\cdot|S|} = \cos\theta$$

so:

$$\frac{X_rX_s + Y_rY_s + Z_rZ_s}{\sqrt{X_r^2+Y_r^2+Z_r^2}\cdot\sqrt{X_s^2+Y_s^2+Z_s^2}} = \cos\theta$$

Figure 12:
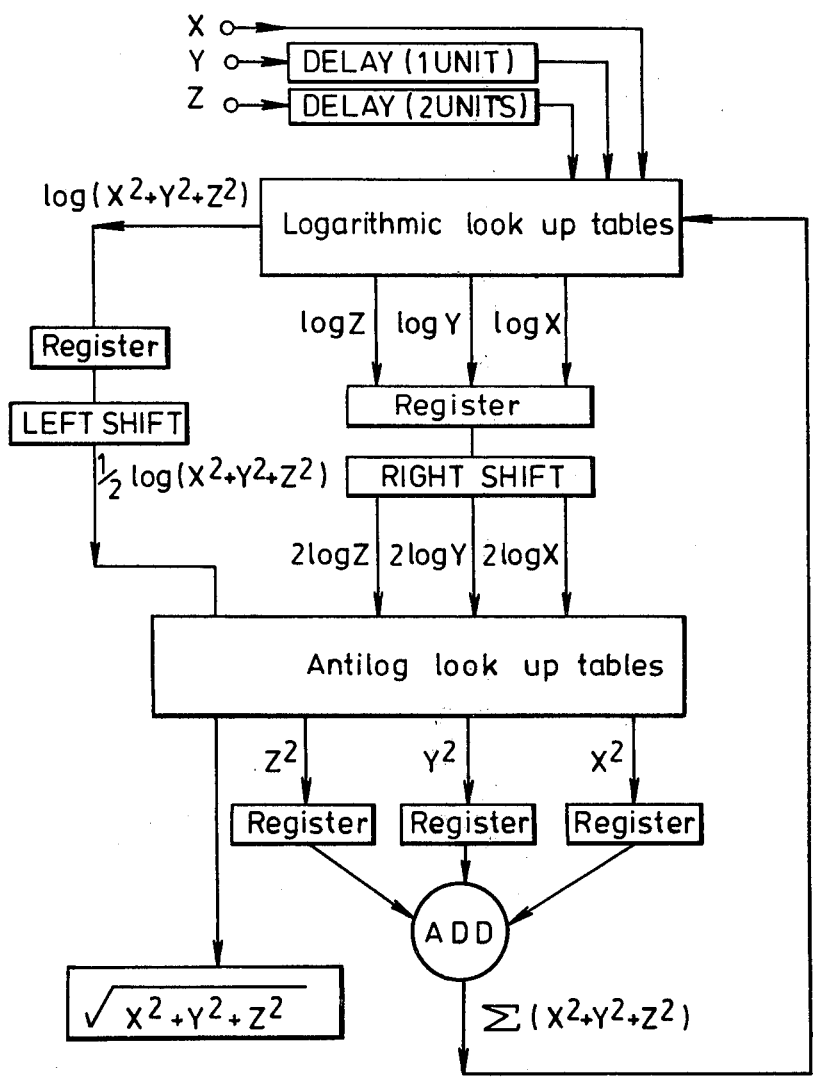

It is preferable that the function be computed in about 500 ns and for this purpose a logarithmic calculating device, the form and operation of which is shown in FIG. 12 can be used to determine $X^2 + Y^2 + Z^2$. The device uses read-only memories to store the necessary logarithmic tables. As the device is operating in binary the left and right shifts of the decimal point result in halving and doubling respectively.

As shown in FIG. 12 the calculation is performed serially, but for even greater speed it can be done in parallel.

Referring again to FIG. 5, processing unit 22 to 24 also rejects information relating to collisions not resulting in expected energy levels. The expected energy levels are pre-set in dependence on the radioactive material used, and a suitable energy window is allowed at each level. The width of the window sets the scatter rejection efficiency.

The ellipse generator means 24 calculates the parameters of the ellipse formed by the intersection of the cone with the source plane. The ellipse is generated according to its vector equation:

$$\vec{r} = a\cos\omega t\,\hat{X} + b\sin\omega t\,\hat{Y}$$

where a and b are the semi-major and semi-minor axes.

The ellipses are initially stored on the charge storage tube 25, which can resolve a grey scale of ten. Such a tube provides a large dynamic range in terms of intensity. The image display means 26 is a television monitor which displays the picture derived from the storage tube 25, which has a non-destructive read-out. A more permanent form of display may of course be used in addition to or in place of the television monitor.

If desired, a plurality of detector heads 20 may be used, so as to increase the input of information available.

Numerous examples of improvements in specific tests can be quoted. There is improved definition between organs or parts of organs, for example between the liver and pancreas in a selenomethionine image, between individual vertebrae in a scan of the spine and between different regions of the heart in radioisotope angiography. In the best case it is possible to delineate individual arteries in blood flow studies of various organs. Smaller sized defects will be observed such as tumours in the early stage of their development. Detail of defects will be resolved in cases of pulmonary embolus or cirrhosis of the liver where at present the diffuse uptake sometimes only shows up as a large general area of low counts.

At present in nuclear medicine it is only generally possible to detect a lesion and say whether it is there or not. The improved spatial resolution will enable the lesion to be characterised to a certain extent. The ability to determine the shape of a defect or to say where it is in relation to a particular anatomical structure constitutes useful information to the surgeon.

The fact that a collimator is not being used means that the number of photons detected per unit activity by the present apparatus compared to the Anger camera system is considerably increased.

The higher counting rates available with the increased sensitivity have a number of advantages from the medical point of view. Images can be obtained in a shorter time hence enabling more patients to be examined and also reducing the time of the test on each individual patient. The latter improvement is particulary helpful with some techniques, for example lung scanning, which involve obtaining multiple scan images and can at present take up to one hour, during which time the patient has to lie completely still. If time is not a limitation then more counts can be accumulated to obtain an image with reduced statistical variations. Alternatively, a smaller dose may be given to diminish radiation hazard. Finally the increased sensitivity is of particular use in dynamic studies such as radioisotope angiography or cerebral blood flow measurement where it is important to study the variation of radioisotope distribution with small incremental periods of time.

The fact that tomographic information is available is another advantage from the clinical standpoint. Simultaneous images, each focussed on a particular plane in the object, can be obtained.

The isotopes that could be used for imaging prior to the present invention are limited to those emitting gamma rays of less than about 500 KeV. This is because at higher energies than this the sensitivity of present imaging systems is too small, and moreover collimation becomes extremely difficult. The disadvantage of being limited to using these lower energy isotopes is that the photons are significantly scattered by body tissue producing degradation of the image. Attempts have been made using the improved energy resolution of semiconductor detector scanners to reduce scatter effects and hence improve spatial resolution. However it has been found impossible to reduce scatter effects without decreasing the sensitivity of detection of unscattered photons also.

The present invention extends the upper limit of the usable energy range to 2 to 3 MeV without substantially reducing the sensitivity. This is due to using the Compton effect. Using these higher energy isotopes reduces the effect of tissue scatter.

Although this specific description has been concerned with the distribution of radioactive material administered for medical diagnostic purposes, the invention has general application where information is required as to the subsequent distribution of an initially introduced radioactive material, for example in non-destructive metallurgical testing. Moreover, the invention also has application in cases where the radioactive material occurs naturally, and it is applicable therefore to gamma ray telescopy.

Various modifications can of course be made without departing from the invention as defined by the appended claims.

I claim:

1. A method of determining the spatial distribution of a radioactive material, comprising positioning a detector adjacent to the location of the radioactive material, determining the positions of and energy losses associated with Compton interactions which occur in said detector as a result of gamma photons emitted by the radioactive material, and deriving in dependence on said positions and energy losses information as to the spatial distribution of the radioactive material.

2. A method according to claim 1 wherein said detector is a semiconductor detector including means to indicate in a three-coordinate system the position of a Compton interaction in said detector and means to indicate the energy loss at the interaction.

3. A method of determining the spatial distribution of a radioactive material, comprising:

positioning a detector adjacent to the location of the radioactive material, said detector being a semiconductor detector with means to indicate in a three-coordinate system the position of a Compton interaction in said detector and means to indicate the energy loss at the interaction;

determining the positions of two Compton interactions in said detector resulting from the same gamma photon emitted by the radioactive material and the energy loss at the first of said interactions; and deriving a probability function of the position of the source of said gamma photon in the form of an ellipse as the intersection of a cone, with a semi-angle equal to the Compton scattering angle and an axis coincident with the line joining said two positions, with the object plane.

4. Apparatus for determining the spatial distribution of a radioactive material, comprising a detector which in use of the apparatus is positioned adjacent to the location of the radioactive material, means for determining the positions of and energy losses associated with Compton interactions which occur in said detector as a result of gamma photons emitted by the radioactive material, and means for deriving in dependence on said positions and energy losses information as to the spatial distribution of the radioactive material.

5. Apparatus according to claim 4 wherein said detector is a semiconductor detector including means to indicate in a three-coordinate system the position of a Compton interaction in said detector and means to indicate the energy loss at the interaction.

6. Apparatus for determining the spatial distribution of a radioactive material, comprising:

a detector which in use of the apparatus is positioned adjacent to the location of the radioactive material, said detector comprising a plurality of slices of semiconductor material having a Schottky barrier on the surfaces thereof;

means to indicate in a three-coordinate system the position of a Compton interaction in said detector;

means to indicate the energy loss at a Compton interaction in said detector; and means for deriving in dependence on said positions and energy losses information as to the spatial distribution of the radioactive material.

7. Apparatus according to claim 6 wherein each said slice has arrays of parallel conducting strips on each major surface, the arrays being orthogonal.

8. Apparatus according to claim 7 further comprising a core matrix assembly for determining from pulses developed in said strips, the position of a Compton interaction in said slice.

9. Apparatus according to claim 7 further comprising means for determining from the amplitude of pulses developed in said strips, the energy loss associated with a Compton interaction in said slice.

10. Apparatus according to claim 6 further comprising means to determine the positions of two Compton interactions in said detector resulting from the same gamma photon, and means to determine a probability function in the from of an ellipse as the intersection of a cone, with a semi-angle equal to the Compton scattering angle and an axis coincident with the line joining said two positions, with the object plane.

11. Apparatus according to claim 10 further comprising a charge storage tube for accumulating a pluralit of said probability functions, and means to produce ar image indicating the spatial distribution of the radioac tive material in the object plane by selecting intersection points of said probability functions.

12. A method of determining the spatial distribution of a radioactive material, the method comprising:

positioning adjacent to the location of the radioactive material a detector having a three-dimensional array of distinguishable positions at which there can occur Compton interactions involving gamma photons;

deriving from the detector signals indicating at which of said positions Compton interactions occur as a result of gamma photons being emitted by the radioactive material and signals indicating the respective energy losses associated with such interactions; and utilizing the signals derived from the detector to derive information as to the spatial distribution of the radioactive material.

13. Apparatus for determining the spatial distribution of a radioactive material, the apparatus comprising:

a detector having a three-dimensional array of distinguishable positions at which there can occur Compton interactions involving gamma photons;

means for deriving from the detector signals indicating at which of said positions Compton interactions occur as a result of gamma photons being emitted by a radioactive material located adjacent to said detector and signals indicating the respective energy losses associated with such interactions; and means for utilizing the signals derived from the detector to derive information as to the spatial distribution of the radioactive material.

14. Apparatus according to claim 13 wherein said means for utilizing the signals derived from the detector comprises:

means for utilizing said signals to identify the impact on the detector of a gamma photon having an energy corresponding to that of photons emitted by a given radioactive material;

means for utilizing said signals to compute, in respect of a photon whose impact is identified by the identifying means, the locus of the possible points on a given notional surface from which the photon could have been emitted by the radioactive material; and means for determining the distribution of the radioactive material over said surface by collating the loci computed by the computing means in respect of a large number of photons.

* * * * *